United States Patent

Unno

[11] Patent Number: 5,757,906
[45] Date of Patent: May 26, 1998

[54] METHOD OF CANCELING ECHOES AND ECHO CANCELER

[75] Inventor: Yoshihiro Unno, Tokyo, Japan

[73] Assignee: NEC Corporation, Tokyo, Japan

[21] Appl. No.: 780,522

[22] Filed: Jan. 8, 1997

Related U.S. Application Data

[63] Continuation of Ser. No. 302,511, Sep. 8, 1994, abandoned.

[30] Foreign Application Priority Data

Sep. 10, 1993 [JP] Japan .................................. 5-225424

[51] Int. Cl.[6] .................................................. H04M 9/08
[52] U.S. Cl. .......................... 379/410; 379/345; 379/406; 379/411
[58] Field of Search .............................. 379/345, 406, 379/407, 408, 409, 410, 411; 370/32.1

[56] References Cited

U.S. PATENT DOCUMENTS

| | | | |
|---|---|---|---|
| 5,245,561 | 9/1993 | Sugiyama et al. | 364/724.19 |
| 5,289,539 | 2/1994 | Maruyama et al. | 379/410 |
| 5,327,459 | 7/1994 | Hara et al. | 375/14 |
| 5,371,789 | 12/1994 | Hirano | 379/410 |
| 5,390,250 | 2/1995 | Janse et al. | 379/410 |
| 5,414,766 | 5/1995 | Cannalire et al. | 379/410 |

OTHER PUBLICATIONS

N. Furuya, et al., "Custom VLSI Echo Canceller", NEC Technical Journal, vol. 39, No. 2, Jan. 14, 1986, pp. 53–62.

*Primary Examiner*—Daniel S. Hunter
*Assistant Examiner*—Scott L. Weaver
*Attorney, Agent, or Firm*—Foley & Lardner

[57] ABSTRACT

An artificial echo signal generator generates an artificial echo signal from received voice signal data stored in a first data memory and a presumed impulse response outputted from a tap coefficient updater. The artificial echo signal is subtracted from an echo signal from a four-wire/two-wire converter by a subtractor, which then outputs a remainder signal that is stored in a second data memory. An updating time controller determines and outputs an updating time based on the data stored in the second data memory. An updating element selector selects one time element of the updating time from the updating time controller. The tap coefficient updater updates the presumed impulse response so as to approach the impulse response of a true echo path at the selected time element, and outputs the updated presumed impulse response to the artificial echo signal generator.

15 Claims, 8 Drawing Sheets

METHOD OF CANCELING ECHOES AND ECHO CANCELER

This application is a continuation of application Ser. No. 08/302.511, filed Sep. 8, 1994, now abandoned.

BACKGROUND OF THE INVENTION

1. Field of the Invention

The present invention relates to a method of canceling echoes and an echo canceler for canceling echoes produced by a four-wire/two-wire converter in a telephone line, and more particularly to a method of canceling echoes and an echo canceler for canceling echoes by sampling a received voice signal in a sampling period, generating an artificial echo signal from the sampled data of the received voice signal and a presumed impulse response of an echo path according to a convolutional operation, subtracting the artificial echo signal from an echo signal to produce a remainder signal, and updating the presumed impulse response so as to approach the impulse response of a true echo path based on data of the remainder signal in each sampling period.

2. Description of the Prior Art

One conventional echo canceler is known from the paper Dedicated Custom VLSI Echo Canceler, NEC Technical Journal, Vol. 39, No. 2, pages 53 to 62, published Jan. 14, 1986 by Nobuji Furuya, Yuzoh Fukushi, Yoshinori Ito, Yoshiaki Matsumoto, Junji Tanabe, Yukio Hagiwara, Sumio Shionoya, Yukio Katsuta, Jun Takayama, and Takashi Araseki.

Figure 1:
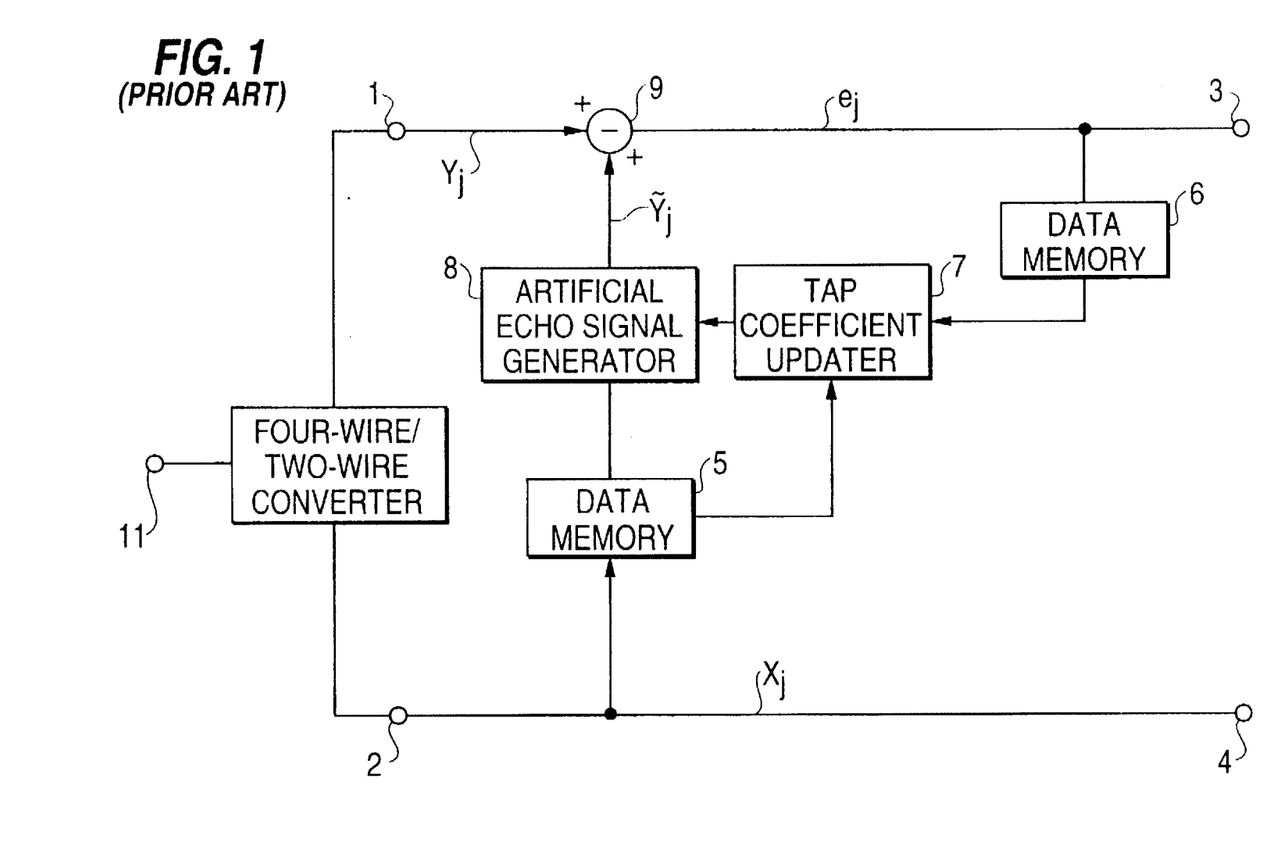
FIG. 1 is a block diagram of a conventional echo canceler.
Figure 2:
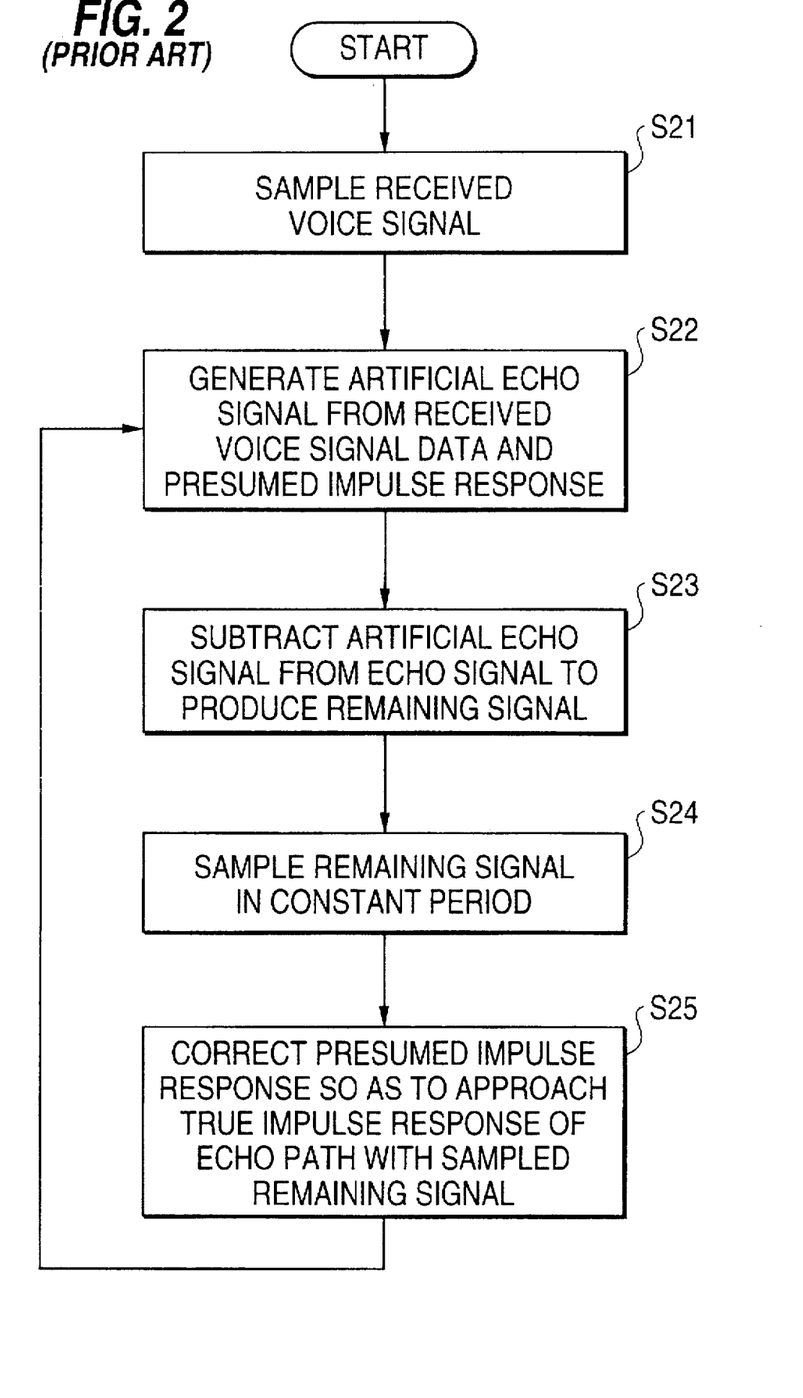
FIG. 2 is a flowchart of an echo canceling process carried out by the conventional echo canceler shown in FIG. 1.

FIG. 1 of the accompanying drawings shows a conventional echo canceler according to the above paper, and FIG. 2 of the accompanying drawings shows a processing sequence of the conventional echo canceler of FIG. 1.

As shown in FIG. 1, the echo canceler comprises a transmission input terminal 1, a reception output terminal 2, a transmission output terminal 3, a reception input terminal 4, a pair of data memories 5, 6, a tap coefficient updater 7, an artificial echo signal generator 8, and a subtractor 9.

A process of canceling an echo with the echo canceler shown in FIG. 1 is described below with reference to FIG. 2.

A received voice signal $X_j$, which is inputted from the reception input terminal 4 at a time j, is successively stored as a series in the data memory 5 in each basic sampling period in a step S21. The received voice signal $X_j$ is also sent to the reception output terminal 2. The received voice signal $X_j$ outputted from the reception output terminal 2 is converted by a four-wire/two-wire converter 10 into a two-wire voice signal, which is then inputted and outputted through a two-wire input/output terminal 11. When the four-wire/two-wire converter 10 malfunctions, part of the received voice signal $X_j$, which passes through the four-wire/two-wire converter 10, leaks as an echo signal $Y_j$ to the transmission input terminal 1.

The artificial echo signal generator 8 reads the series of received voice signals $X_j$ from the data memory 5 and a presumed impulse response from the tap coefficient updater 7, and generates an artificial echo signal $\tilde{Y}_j$ from the series of received voice signals Xj and the presumed impulse response according to a convolutional operation in a step 22. If the presumed impulse response at a time j is indicated by $h_i^j$, then the artificial echo signal $\tilde{Y}_j$ is represented by the following equation (1):

$$Y_j = \sum_{j=0}^{N} h_i^j \cdot X_{j-1} \quad (1)$$

where i=0, 1, ..., N, where N corresponds to the impulse response length of the echo path.

The subtractor 9 subtracts the artificial echo signal $\tilde{Y}_j$ from the echo signal $Y_j$ inputted from the transmission input terminal 1 according to the equation (2):

$$e_j = Y_j - \tilde{Y}_j \quad (2)$$

to cancel the echo component contained in the transmitted signal, and a remainder signal $e_j$ is then transmitted through the transmission output terminal 3 to the transmission path in a step 23.

The remainder signal $e_j$ is successively stored as a series in the data memory 6 in each sampling period in a step 24. Using the stored series of remainder signals $e_j$, the tap coefficient updater 7 corrects and updates the presumed impulse response so that it approaches the impulse response of a true echo path in a step 25. In the above-described paper, the learning identification method is employed to update the presumed impulse response, and the updating of the presumed impulse response is represented by the following equations:

$$h_i^{j+1} = h_i^j + \Delta h_i^j \quad (3)$$

$$\Delta h_i^j = \alpha e_j/P_j \cdot X_{j-1} \quad (4)$$

$$P_j = \sum_{i=0}^{N} X_{j-1}^2 \quad (5)$$

where α is a corrective coefficient which is generally in the range of 0<α<2.

In the above conventional echo canceler, a tap coefficient used in the calculation of the artificial echo signal has been updated in each basic period. More specifically, a tap coefficient is updated as follows: The tap coefficient is loaded from a memory into a register, corrected, and saved in the memory. Calculations required to load the tap coefficient from the memory into the register and save the tap coefficient in the memory take up a major portion of a process of updating the tap coefficient. Since the conventional echo canceler requires a large amount of calculation in each basic period in order to update the presumed impulse response, the echo canceler must process a large amount of data.

SUMMARY OF THE INVENTION

It is therefore an object of the present invention to provide a method of canceling echoes and an echo canceler for canceling echoes without the need for a large amount of calculation to update tap coefficients through the processing of a small amount of data.

To achieve the above object, there is provided in accordance with the present invention a method of canceling an echo produced by a four-wire/two-wire converter in a telephone line by sampling a received voice signal in each sampling period, generating an artificial echo signal from sampled data of the received voice signal and a presumed impulse response of an echo path according to a convolutional operation, subtracting the artificial echo signal from an echo signal to produce a remainder signal, and updating the presumed impulse response so as to approach the impulse response of a true echo path based on data of the remainder signal in each sampling period, the method comprising the steps of determining an updating time for updating the presumed impulse response, selecting one time element of the updating time which is to be used to update the presumed impulse response, and updating the presumed impulse response at the selected time element.

The step of determining an updating time may comprise a step of determining an updating time according to an algorithm composed of random numbers.

Alternatively, the step of determining an updating time may comprise a step of determining an updating time according to an algorithm composed of a constant.

Alternatively, the step of determining an updating time may comprise a step of determining an updating time according to an algorithm under external control.

The step of selecting one time element may comprise a step of determining one time element with random numbers.

Alternatively, the step of selecting one time element may comprise a step of selecting one time element from predetermined patterns.

Alternatively, the step of selecting one time element may comprise a step of selecting one time element with an external control signal.

According to the present invention, there is also provided, for canceling an echo produced by a four-wire/two-wire converter in a telephone line, an echo canceler comprising a first data memory for storing a received voice signal in each sampling period, an artificial echo signal generator for generating an artificial echo signal from data stored in the first data memory and a presumed impulse response of an echo path according to a convolutional operation, a subtractor for subtracting the artificial echo signal from an echo signal to produce a remainder signal, a second data memory for storing the remainder signal in each sampling period, a tap coefficient updater for updating the presumed impulse response so as to approach the impulse response of a true echo path by referring to the data stored in the second data memory, an updating time controller for determining an updating time for updating the presumed impulse response, and an updating element selector for selecting one time element of the updating time supplied from the updating time controller which is to be used to update the presumed impulse response, the arrangement being such that the tap coefficient updater updates the presumed impulse response at the one selected time element.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 3:
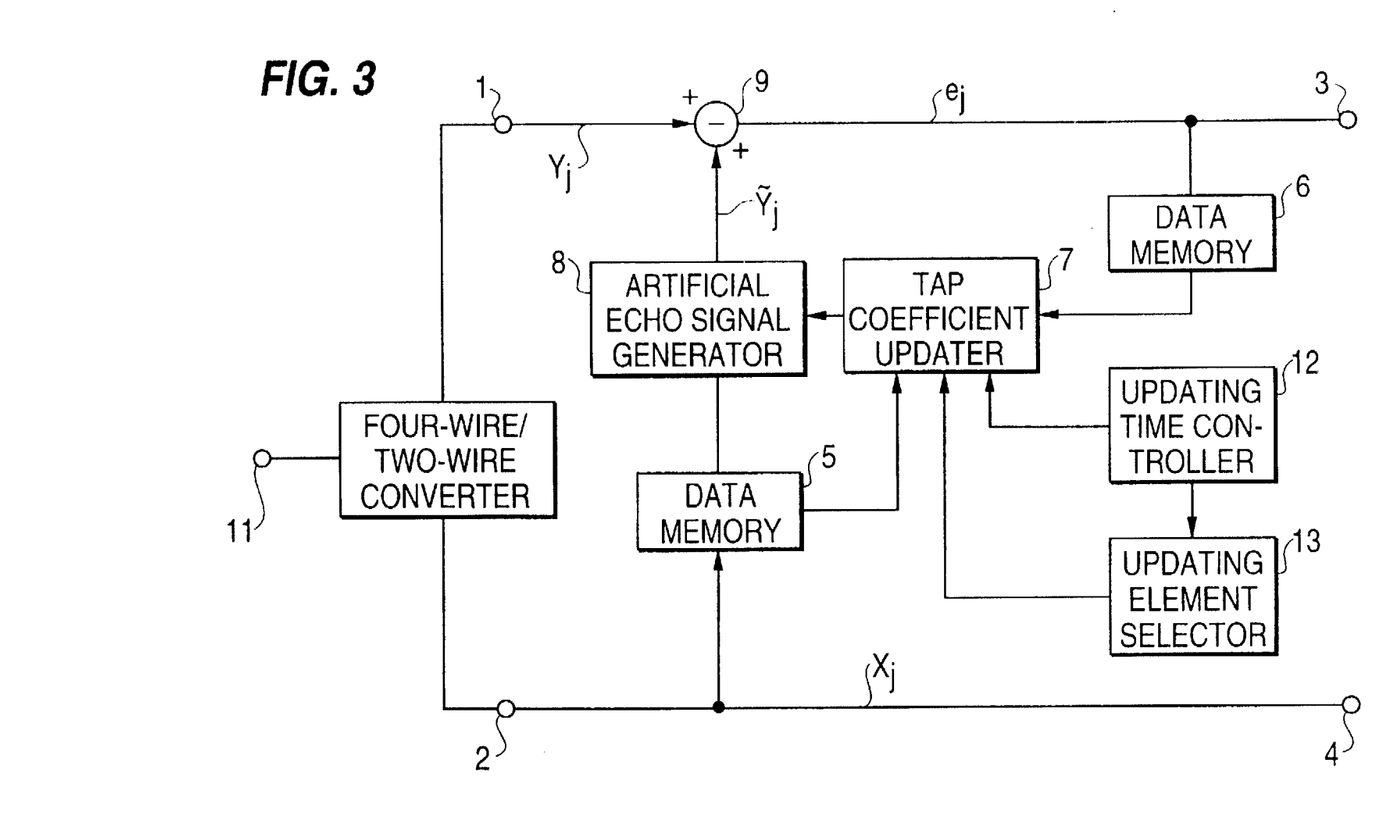
FIG. 3 is a block diagram of an echo canceler according to the present invention.

As shown in FIG. 3, an echo canceler according to the present invention has a transmission input terminal 1, a reception output terminal 2, a transmission output terminal 3, a reception input terminal 4, a pair of data memories 5, 6, a tap coefficient updater 7, an artificial echo signal generator 8, and a subtractor 9 which are identical to those shown in FIG. 1. In addition, the echo canceler includes an updating time controller 12 and an updating element selector 13.

Figure 4:
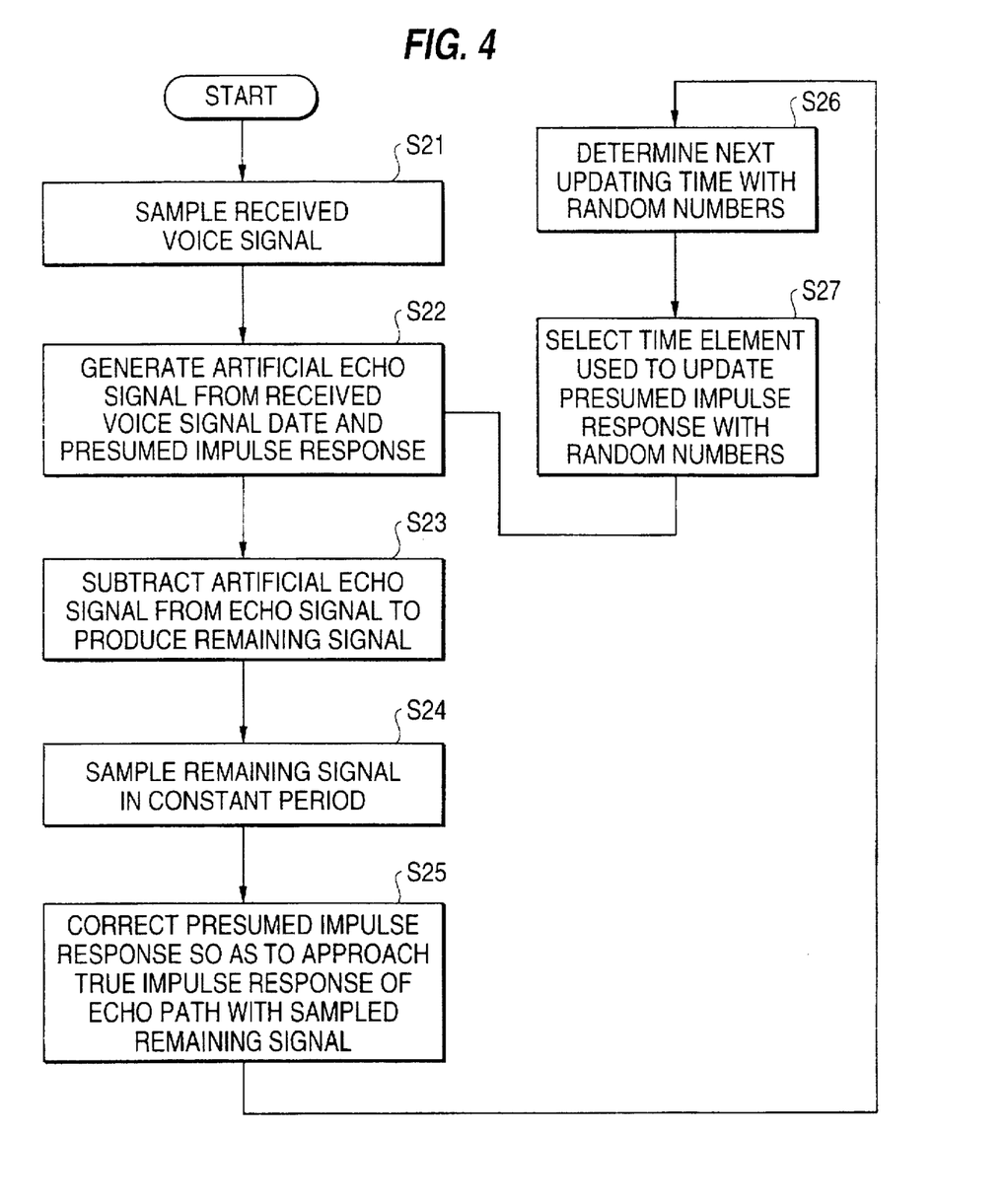
FIG. 4 is a flowchart of an echo canceling method according to a first embodiment of the present invention which can be carried out by the echo canceler shown in FIG. 3.

The echo canceler shown in FIG. 3 can carry out an echo canceling method according to a first embodiment of the present invention as shown in FIG. 4.

In the echo canceling method according to the first embodiment, the data memories 5, 6, the tap coefficient updater 7, the artificial echo signal generator 8, and the subtractor 9 effect the same process as the processing sequence shown in FIG. 2 in the steps 21, 22, 23, 24, and 25.

After the presumed impulse response is updated by the tap coefficient updater 7 in step 25, the updating time controller 12 determines a next updating time according to a predetermined algorithm in a step 26. If the presumed impulse response is updated at a time j−1 and the updating time controller 12 produces an output M at that time, then the next updating time for updating the presumed impulse response is j+M−1. Though various algorithms are available to determine the updating time, random numbers are used in this embodiment to determine the updating time.

When supplied with the updating time from the updating time controller 12, the updating element selector 13 determines which one of M time elements ranging from j to j+M−1 is to be used for updating the presumed impulse response, and outputs an element number km ($0 \leq k_1 < k_2 < \ldots < k_n < M$) representing the determined time element in a step 27. Various algorithms are also available to determine this element number. In this embodiment, n is determined to satisfy the ratio n/M=R (R is a predetermined real number), and the time elements ranging from $k_1$ to $k_n$ are determined using random numbers.

The tap coefficient updater 7 then updates the presumed impulse response according to the following equation (6) using the time j+M−1 indicated by the updating time controller 12 in step 22:

$$h_i^{j+M} = h_i^j + \sum_{m=1}^{n} \Delta h_i^{j+k_m} \tag{6}$$

where $\Delta h_i^{j+k}m$ is given by the equation (4) above.

In this echo canceler, a corrected value of a tap coefficient is stored in each cycle, and the tap coefficient is updated once in a plurality of periods. Though the tap coefficient is corrected for a plurality of periods in one updating period, the amount of calculation required is reduced, and the amount of data transferred between a memory and a register is greatly reduced. Furthermore, any characteristic degradations are so small that they can practically be ignored in communication paths (fixed communication circuits) where the impulse response of an echo signal does not vary frequently.

While random numbers are used as the algorithm in the updating time controller 12 in step 26, the algorithm may rely upon a pseudo-random number generator for generating a predetermined range of random numbers rather than truly random numbers.

The ratio n/M may be set to n/M=1 in the updating time controller 12. According to the equation (6), the number of products and sums per unit time for updating the presumed impulse response remains the same as with the conventional echo canceler. With n/M=1, however, the amount of data transferred between a memory and a register can greatly be reduced.

Figure 5:
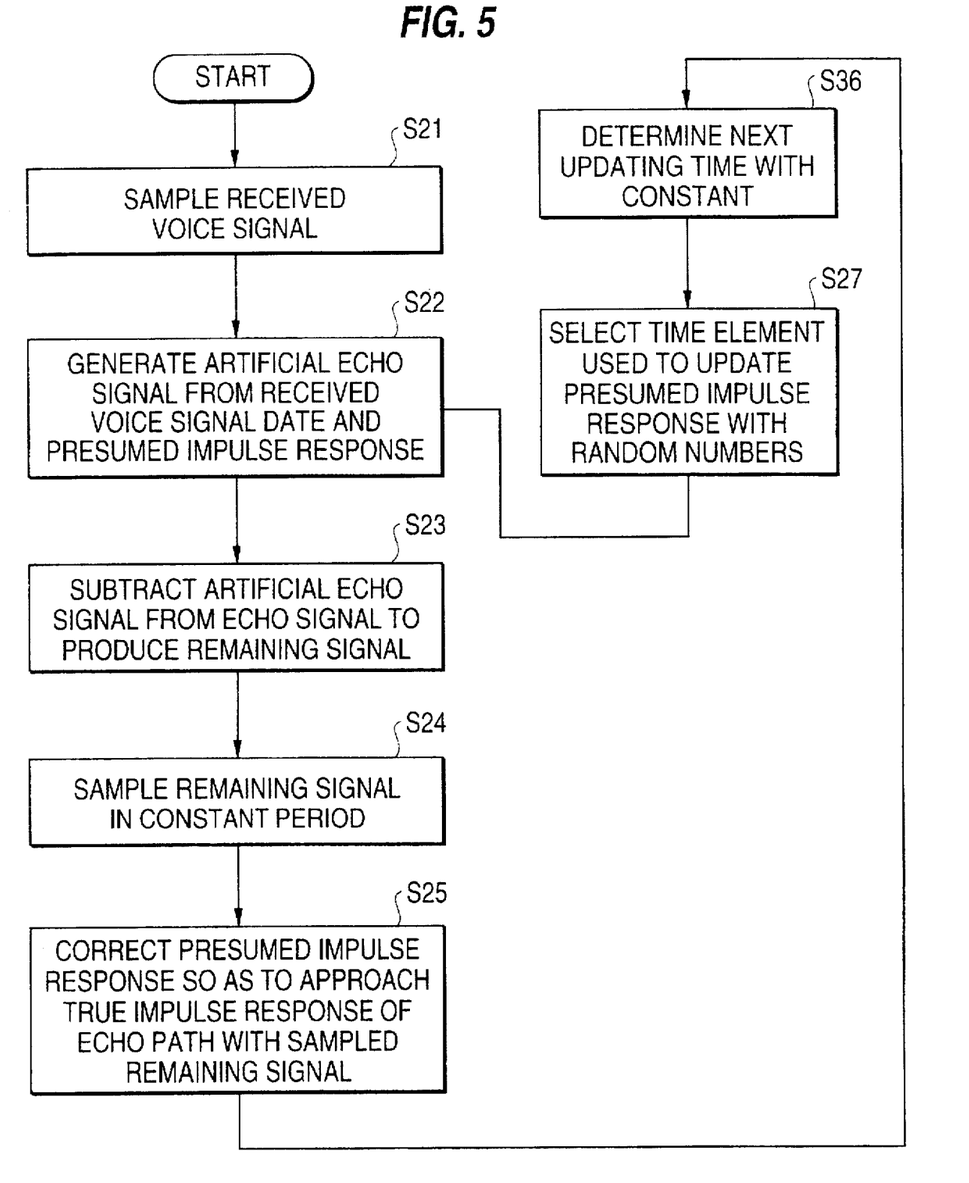
FIG. 5 is a flowchart of an echo canceling method according to a second embodiment of the present invention which can be carried out by the echo canceler shown in FIG. 3.

According to a second embodiment of the present invention shown in FIG. 5, an echo canceling method which is carried out by the echo canceler shown in FIG. 3 differs from the echo canceling method shown in FIG. 4 in that a step 36 is included in place of step 26 shown in FIG. 4.

In step 36, the updating time controller 12 determines a next updating time using a predetermined constant.

Figure 6:
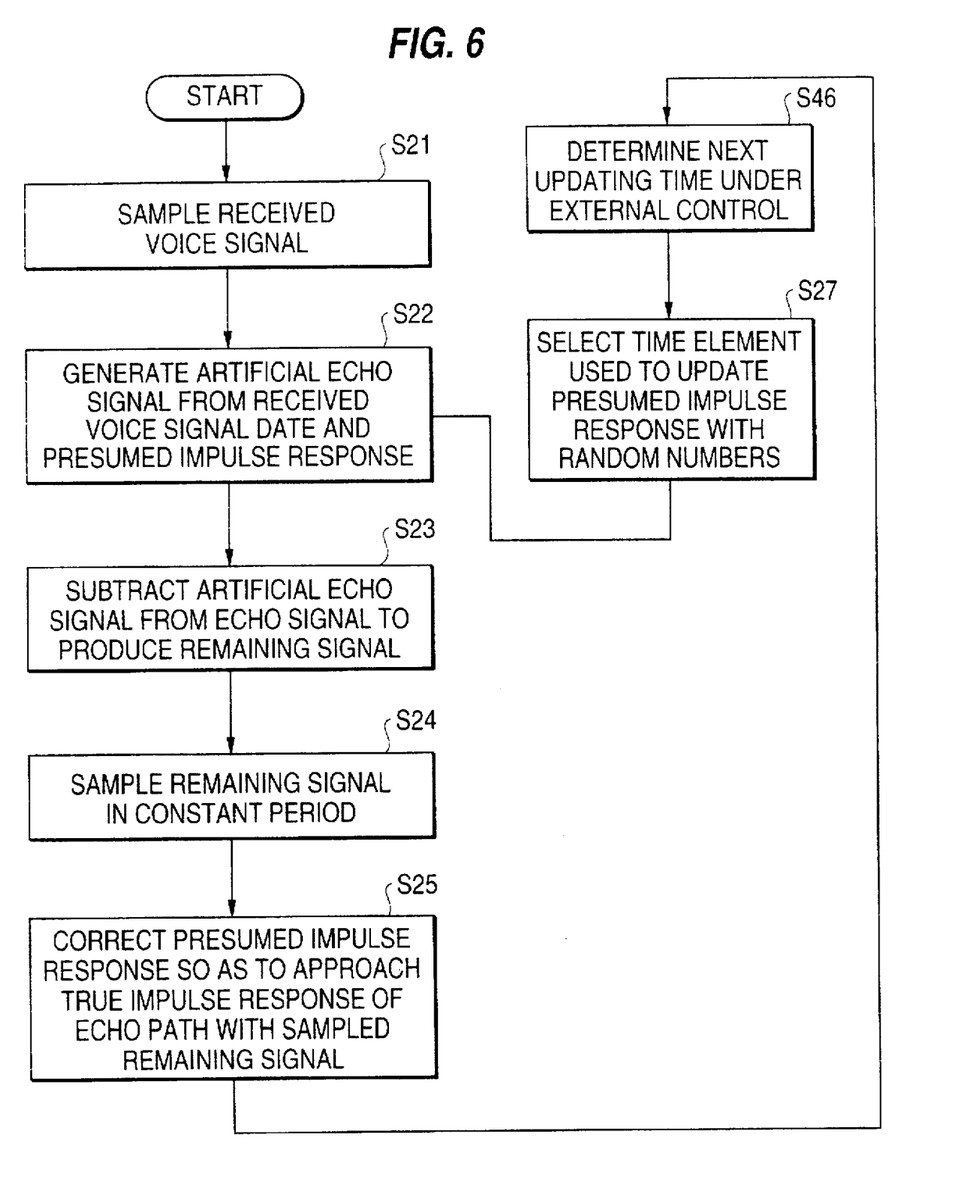
FIG. 6 is a flowchart of an echo canceling method according to a third embodiment of the present invention which can be carried out by the echo canceler shown in FIG. 3.

FIG. 6 shows an echo canceling method according to a third embodiment of the present invention. The echo canceling method shown in FIG. 6 is carried out by the echo canceler shown in FIG. 3 and differs from the echo canceling method shown in FIG. 4 in that step 26 shown in FIG. 4 is replaced with a step 46.

In step 46, the updating time controller 12 determines a next updating time under control by an external device. To reduce the amount of calculation of the echo canceler under control by the external device, the updating time controller 12 is controlled to increase its output or the updating element selector 13 is controlled to reduce the ratio R.

Figure 7:
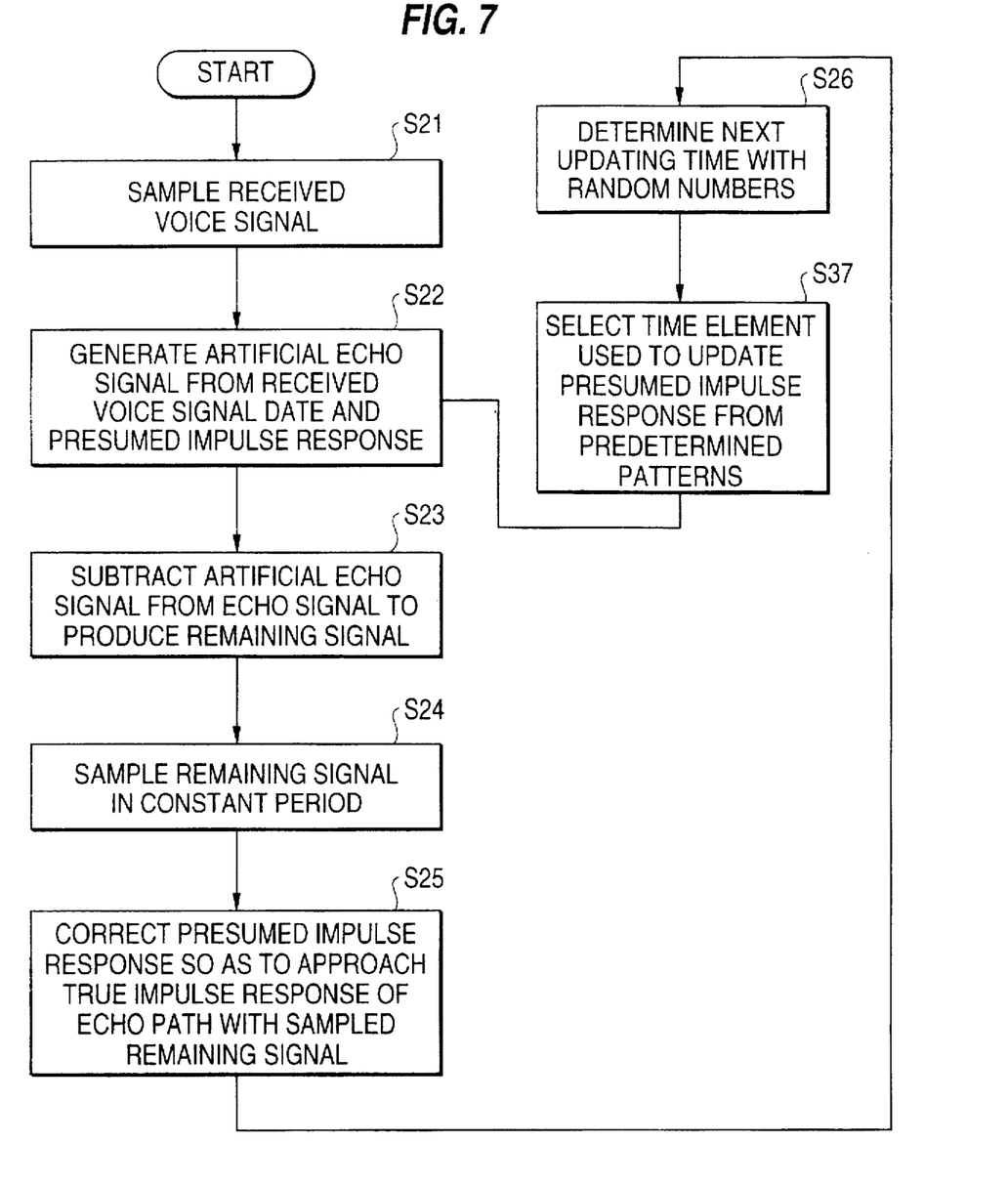
FIG. 7 is a flowchart of an echo canceling method according to a fourth embodiment of the present invention which can be carried out by the echo canceler shown in FIG. 3.

According to a fourth embodiment of the present invention shown in FIG. 7, an echo canceling method which is carried out by the echo canceler shown in FIG. 3 differs from the echo canceling method shown in FIG. 4 in that a step 37 is included in place of step 27 shown in FIG. 4.

In step 37, the updating element selector 13 selects a timing element used to update the presumed impulse response from several predetermined patterns.

Figure 8:
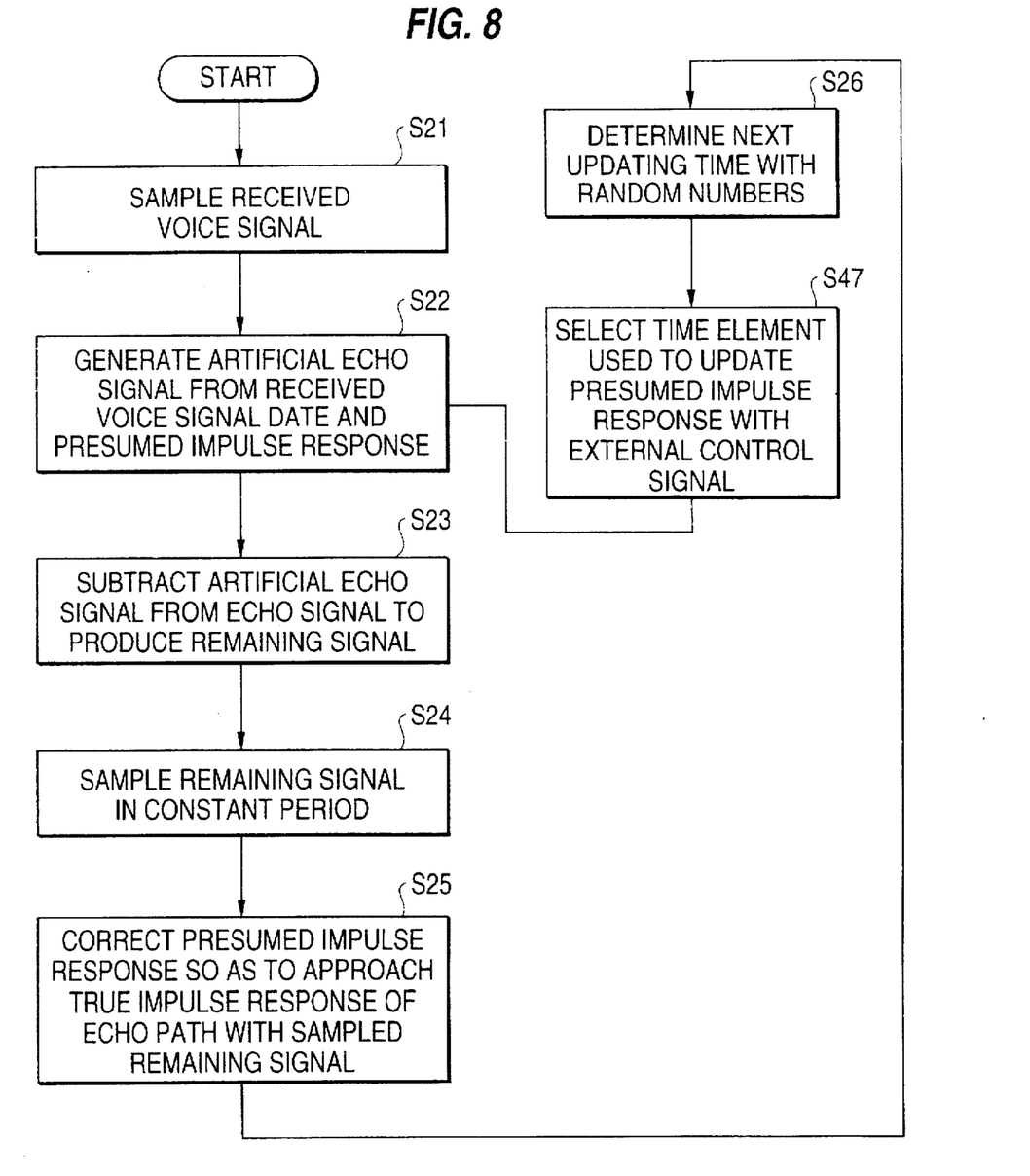
FIG. 8 is a flowchart of an echo canceling method according to a fifth embodiment of the present invention which can be carried out by the echo canceler shown in FIG. 3.

An echo canceling method according to a fifth embodiment of the present invention shown in FIG. 8 is carried out by the echo canceler shown in FIG. 3 and differs from the echo canceling method shown in FIG. 4 in that step 27 shown in FIG. 4 is replaced with a step 47.

In step 47, the updating element selector 13 selects a timing element used to update the presumed impulse response with a control signal from an external device.

The echo canceler according to the present invention may additionally include a near-end talk signal detector as described in Chapter 4.4 of the paper referred to above.

With the echo canceling methods and the echo canceler according to the present invention, a corrected value of a tap coefficient is stored in each cycle, and the tap coefficient is updated once in a plurality of periods. Therefore, the amount of calculation required is reduced, and the amount of data transferred between a memory and a register is greatly reduced. The echo canceler thus has a reduced power requirement.

Although certain preferred embodiments of the present invention have been shown and described in detail, it should be understood that various changes and modifications may be made therein without departing from the scope of the appended claims.

What is claimed is:

1. A method of canceling an echo produced by a four-wire/two-wire converter situated between a two-wire telephone line and a four-wire telephone line, by sampling a received voice signal at consecutive sampling time instants received from the four-wire telephone line, said received voice signal being output to the two-wire telephone line via the four-wire/two-wire converter for each consecutive sampling time instant, generating an artificial echo signal from sampled data of the received voice signal and a presumed impulse response of an echo path which corresponds to a path in which a received echo signal that is created based on the received voice signal and a malfunction in said four-wire/two-wire converter is sent back to the four-wire telephone line from the two-wire/four-wire converter, said artificial echo signal being generated according to a convolutional operation, subtracting the artificial echo signal from the echo signal actually received over the echo path to produce a remainder signal, and updating the presumed impulse response so as to approximate an impulse response of the echo signal actually received over the echo path based on data of the remainder signal in each consecutive sampling time instant, said method comprising the steps of:

determining an updating time for updating the presumed impulse response, said updating time corresponding to an integer multiple of consecutive sampling time instants after a most-recent updating time;

selecting one sampling time element of said updating time for updating the presumed impulse response, said one sampling time element corresponding to one of said consecutive sampling time instants of said updating time; and updating the presumed impulse response at said updating time.

2. A method according to claim 1, wherein said step of determining an updating time comprises the step of determining the updating time according to an algorithm using random numbers.

3. A method according to claim 1, wherein said step of determining an updating time comprises the step of determining the updating time using a constant.

4. A method according to claim 1, wherein said step of determining an updating time comprises the step of determining the updating time according to an algorithm under external control.

5. A method according to claim 1, wherein said step of selecting one sampling time element comprises the step of selecting the one sampling time element with random numbers.

6. A method according to claim 1, wherein said step of selecting one sampling time element comprises the step of selecting the one sampling time element from predetermined patterns.

7. A method according to claim 1, wherein said step of selecting one sampling time element comprises the step of selecting the one sampling time element with an external control signal.

8. An echo canceler according to claim 1, wherein the malfunction causes a leakage of a portion of the received voice signal that is input from the four-wire telephone line of said four-wire/two-wire converter to be echoed back to said four-wire telephone line.

9. A method according to claim 1, further comprising the step of providing a pseudo-random number generator which determines a pseudo-random number to determine the integer multiple of consecutive sampling time instants.

10. An echo canceler for canceling an echo produced by a four-wire/two-wire converter in a telephone line, said four-wire/two-wire converter being situated between a four-wire telephone line and a two-wire telephone line, comprising:

a first data memory for storing a received voice signal that is received and sampled at consecutive sampling time instants from the four-wire line in each consecutive sampling time instant;

an artificial echo signal generator for generating an artificial echo signal from data stored in said first data memory and a presumed impulse response of an echo path according to a convolutional operation. said echo path corresponding to a path in which an echo signal that is created based on the received voice signal and a malfunction in the four-wire/two-wire converter is sent back to the four-wire telephone line from the two-wire/four-wire converter;

a subtractor for subtracting the artificial echo signal from an echo signal that is actually received over the echo path to produce a remainder signal;

a second data memory for storing the remainder signal in each consecutive sampling time instant;

a tap coefficient updater for updating the presumed impulse response so as to approximate an impulse response of the echo signal that is actually received over the echo path using data stored in said second data memory;

an updating time controller for determining an updating time instant for updating the presumed impulse response. said updating time instant corresponding to an integer multiple of consecutive sampling time instants with respect to a most-recent updating time; and an updating element selector for selecting one of the integer multiple of consecutive sampling time instants for updating the presumed impulse response. of said updating time instant determined from said updating time controller. said one consecutive sampling time instant corresponding to one of said consecutive sampling time instants of said updating time;

wherein said tap coefficient updater updates the presumed impulse response at said updating time instant.

11. An echo canceler according to claim 10. wherein said updating element selector includes a pseudo-random number generator which determines a pseudo-random number to determine the one of the integer multiple of consecutive sampling time instants.

12. An echo canceler according to claim 10. wherein said updating element selector includes a pseudo-random number generator which determines a pseudo-random number k. k being an integer between 1 and M. inclusive. to determine the one consecutive sampling time instant. M being a natural number.

13. An echo canceler according to claim 10. wherein said tap coefficient updater updates the presumed impulse response for all taps of said echo canceler at said updating time instant. and wherein said updating time instant is different in time from said one of said consecutive sampling time instants.

14. An echo canceler for canceling an echo produced in a four-wire to two-wire converter for a telephone line. comprising:

a first data memory for successively storing data representative of a received voice signal that is received in consecutive sampling time instants;

an artificial echo signal generator for generating an artificial echo signal by a convolution calculation of an estimated value of an impulse response with respect to a path of the echo and the data stored in said first data memory;

a subtractor for subtracting the artificial echo signal from the echo and for outputting a remainder signal;

a second data memory for cumulatively storing the remainder signal for each consecutive sampling time instant;

a tap coefficient updating section for referring to the remainder signals stored in said second data memory to update the estimated value of the impulse response so that the artificial echo signal approximates the echo;

an updating time controller for determining a time. which is a time corresponding to M sampling time instants after a most-recent updating time. as a next updating time. M being a natural number; and an updating element selector for selecting one sampling time instant from among the M sampling time instants within an interval from the most-recent updating time up to the next updating time determined by said updating time controller.

wherein said tap coefficient updating section performs updating of the estimated value of the impulse response by using the received voice signal at a time instant corresponding to the one time instant selected by said updating element selector. the updating being performed at a time corresponding to the updating time determined by said updating time controller.

15. An echo canceler according to claim 14. wherein said tap coefficient updating section updates the estimated value of the impulse response for all taps of said echo canceler at said updating time. and wherein said updating time is different in time from said one sampling time instant.

* * * * *